US011113612B2

(12) United States Patent
Martin et al.

(10) Patent No.: US 11,113,612 B2
(45) Date of Patent: Sep. 7, 2021

(54) PREDICTIVE ASSET OPTIMIZATION FOR COMPUTER RESOURCES

(71) Applicant: MORGAN STANLEY SERVICES GROUP INC., New York, NY (US)

(72) Inventors: Reginald W. Martin, Kowloon (CN); Hongbin Zhang, Shanghai (CN); Jian Cao, Shanghai (CN)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 16/472,916

(22) PCT Filed: Dec. 26, 2016

(86) PCT No.: PCT/CN2016/112086
§ 371 (c)(1),
(2) Date: Jun. 24, 2019

(87) PCT Pub. No.: WO2018/119568
PCT Pub. Date: Jul. 5, 2018

(65) Prior Publication Data
US 2020/0074323 A1  Mar. 5, 2020

(51) Int. Cl.
*G06N 5/04* (2006.01)
*G06F 16/28* (2019.01)
(Continued)

(52) U.S. Cl.
CPC ........... *G06N 5/04* (2013.01); *G06F 16/2474* (2019.01); *G06F 16/285* (2019.01); *G06F 17/142* (2013.01); *G06Q 10/06313* (2013.01)

(58) Field of Classification Search
None
See application file for complete search history.

(56) References Cited

U.S. PATENT DOCUMENTS

2004/0210871 A1  10/2004 Hasegawa
2010/0082507 A1*  4/2010 Ganapathi ............ G06F 16/217
706/12
(Continued)

FOREIGN PATENT DOCUMENTS

CN  102104509 A  6/2011
CN  102664812 A  9/2012
(Continued)

OTHER PUBLICATIONS

International Search Report and Written Opinion for International Application No. PCT/CN2016/112086 dated Sep. 27, 2017.
(Continued)

*Primary Examiner* — Tony Mahmoudi
*Assistant Examiner* — Umar Mian
(74) *Attorney, Agent, or Firm* — K&L Gates LLP

(57) ABSTRACT

Computer-implemented systems and methods forecast network resource and/or infrastructure needs for an enterprise computer system that employs network servers to host resources that are requested by network users. Based on the forecasts, the network resources can be scaled or provisioned accordingly. The state of the network servers can be dynamically adjusted to meet the request needs of the users while reducing excess capacity. The forecasting techniques of the present invention are also applicable to cloud computing environments, Based on the forecasts, the cloud server pool can be scaled dynamically, so that the system's scale satisfies the changing requests and avoids wasting resources when the system is under low load.

10 Claims, 5 Drawing Sheets

(51) Int. Cl.
*G06F 16/2458* (2019.01)
*G06F 17/14* (2006.01)
*G06Q 10/06* (2012.01)

(56) References Cited

U.S. PATENT DOCUMENTS

| | | | |
|---|---|---|---|
| 2011/0179492 A1* | 7/2011 | Markopoulou | G06F 21/552 726/25 |
| 2011/0320546 A1 | 12/2011 | Holden | |
| 2012/0197626 A1* | 8/2012 | Kejariwal | G06F 11/3419 703/22 |
| 2013/0091503 A1 | 4/2013 | Painsky | |
| 2013/0139152 A1 | 5/2013 | Chang et al. | |
| 2015/0026108 A1* | 1/2015 | Portegys | G06F 9/5083 706/21 |
| 2015/0113120 A1 | 4/2015 | Jacobson | |
| 2017/0034720 A1* | 2/2017 | Gopalakrishnan | H04W 16/18 |
| 2017/0126795 A1* | 5/2017 | Kumar | H04L 41/5012 |
| 2017/0372224 A1* | 12/2017 | Reimann | G06N 20/00 |

FOREIGN PATENT DOCUMENTS

| | | |
|---|---|---|
| CN | 103490956 A | 1/2014 |
| JP | 2005-018304 A | 1/2005 |
| JP | 2005-328673 A | 11/2005 |
| JP | 2006-209276 A | 8/2006 |
| JP | 2016-014990 A | 1/2016 |

OTHER PUBLICATIONS

Farahnakian et al., Energy Aware Consolidation Algorithm based on K-nearest Neighbor Regression for Cloud Data Centers, 2013 IEEE/ACM 6th International Conference on Utility and Cloud Computing, pp. 256-259.

Farahnakian et al., Utilization Prediction Aware VM Consolidation Approach for Green Cloud Computing, 2015 IEEE 8th International Conference on Cloud Computing, pp. 381-388.

Kondaveeti, Anirudh, Multivariate Time Series Forecasting for Virtual Machine Capacity Planning, Oct. 7, 2015, available at: https://tanzu.vmware.com/content/blog/multivariate-time-series-forecasting-for-virtual-machine-capacity-planning.

* cited by examiner

PREDICTIVE ASSET OPTIMIZATION FOR COMPUTER RESOURCES

The present application is a National Stage of International Application No. PCT/CN2016/112086, filed on Dec. 26, 2016.

BACKGROUND

Today enterprises with large-scale computer infrastructures tend to super-size their virtual desktop/application infrastructure requirements in order to readily accommodate the maximum number of concurrent users they envision using their applications on any given day. This is viewed as a means to provide assurances that their users will not suffer degraded performance or unwarranted downtime. While this approach may sound reasonable, it unfortunately leads to a proliferation of servers that largely go unused or under-used for extensive periods of time. This over provisioning ultimately means that the enterprise unnecessarily takes on increased capital expenditures and operating expenses throughout the year with regards to licensing, power, heat, cooling, and data center space, to name a few.

Several different approaches of time series forecasting have been proposed previously to forecast an enterprise's computer infrastructure needs. This prior research ranges from using classical models like linear regression, exponential smoothing, and autoregressive integrated moving average (ARIMA), to more sophisticated, nonlinear methods of computational intelligence, such as support vector machine (SVM), artificial neural networks (ANN) and fuzzy logic. The k-Nearest Neighbor (k-NN) algorithm has also been extended recently to time series forecasting, but existing research in this area focuses on individual historical data, without referencing any extra associated metrics. Therefore, most applications are constrained to univariate time series, using only the shape of load curve in a single dimension to identify similar nearest neighbors in the past, while the correlations among large dimensional feature spaces are often ignored. However, since many of the measured computer hardware metrics are closely related to each other, the historical knowledge extracted from a single dimension is inadequate compared with that collected from group of time series that share similar behavior.

SUMMARY

In one general aspect, the present invention is directed to computer-implemented systems and methods for forecasting network resource and/or infrastructure needs for an enterprise computer system that employs network servers to host resources (applications, data, etc.) that are requested by network users. Based on the forecasts, the network resources can be scaled or provisioned accordingly. That is, for example, the state of the network servers can be dynamically adjusted to meet the request needs of the users while reducing excess capacity. The forecasting techniques of the present invention are also applicable to cloud computing environments. Based on the forecasts, the cloud server pool can be scaled dynamically, so that the system's scale satisfies the changing requests and avoids wasting resources when the system is under low load.

The forecasts are generated based on historical data about the user requests for network resources. In one scenario, multivariate k-nearest neighbor (k-NN) forecasting is used based on variant grouping of the requests that are grouped based on their metrics according to correlation analysis so that dependencies between metrics within the same group is high. A multivariate k-NN algorithm is then performed on each group to generate multi-step ahead predictions. This approach reduces the impact of other unrelated metrics so that the prediction performance together with the prediction speed is improved. Another forecasting technique uses a prediction and stripe sampling approach. By predicting the future number of requests in unit time, analyzing the features of requests and classifying the requests accordingly, determining the slice sampling strategy, future detail workload data can be generated. Yet another approach is an adaptive scheduling algorithm that is based on request pattern prediction. This algorithm can determine the adaptive capacity of the system for different workloads and can adjust the cloud resources used by system based on the history and current system load, making the system able to satisfy the dynamic load while reducing waste.

These and other benefits from embodiments of the present invention will be apparent from the description that follows.

FIGURES

Various embodiments of the present invention are described herein by way of example in connection with the following figures, wherein.

DESCRIPTION

Figure 1:
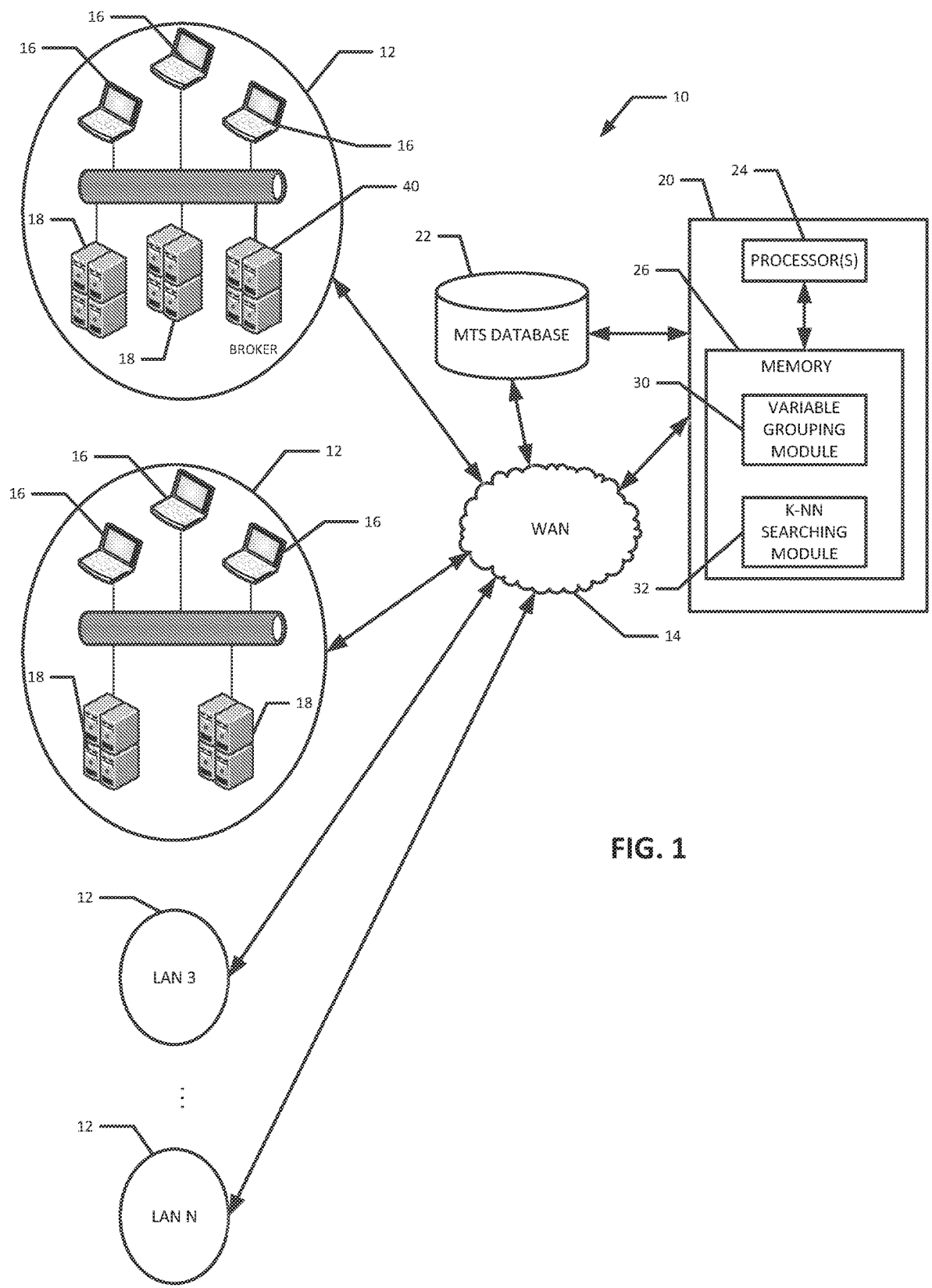
FIG. 1 is block diagram of an enterprise computer system according to various embodiments of the present invention.

In one general aspect, embodiments of the present invention can be used to predict future computer resource needs for an enterprise. One exemplary enterprise computer system 10 is illustrated in FIG. 1. The enterprise computer system 10 illustrated in FIG. 1 includes several local area networks (LANs) 12 interconnected with a wide area network (WAN) 14. Each LAN 12 can include a number of client computers 16 and a number of network servers 18. The network servers 18 may, for example, host computer resources, such as computer programs, data, storage devices, and printers, for the client computers 16 in its LAN 12 or from other LANs 12, depending on the implementation.

A resource prediction computer system 20 performs the resource predictions for the enterprise based on, according to various embodiments, multivariate time-series (MTS) data for the network servers 18, where the MTS data are stored in a database computer system 22. The resource prediction computer system 20 and MTS database system 22 are shown in FIG. 1 as being connected to the WAN 14 for illustration purposes, although one or both of them could be included with one of the illustrated LANs 12. They could also be connected to different LANs 12 and WANs 14 in the enterprise's network. The resource prediction computer system 20 may be implemented as one or number of interconnected computer devices, such as a server(s), a mainframes(s), a workstation(s), and/or any other suitable computer device. Each such computer device of the resource prediction computer system 20 may include one or more processors 24 and one or more memory units 26. The memory units 26 may comprise both primary computer storage (e.g., RAM and ROM) and second computer storage (e.g., HDDs, SSDs, flash). The processor(s) 24 may include a microprocessor(s) that executes computer instructions (e.g., software) stored in the memory units 26, such as a variable grouping module 30 and the k-nearest neighbor (k-NN) searching module 32, as shown in FIG. 1 and described further below. For illustration purposes, the illustrated resource prediction computer system 20 includes only one computer, and only one processor 24 and one memory unit 26 are illustrated, although it should be recognized that the present invention is not so limited and that the resource prediction computer system 20 can be scaled as needed.

The MTS database 22 stores time series computer usage and hardware statistics for the network servers 18 of the enterprise system 10. The statistics can include values for a number of variables related to each user resource request, such as:

username of the user requesting the resource
the start time of the request
the end time of the request
the total time of the request
the active time of the request
the process or resource requested
an ID for the network server that handled the request
the geographic location of the network server that handled the request
CPU utilization-primary memory (e.g., RAM) utilization of the network server
the disk IO (total read and write operations to disk memory or other secondary computer memory) of the network server The MTS database 22 may be implemented with one or more database servers as needed that run database management system (DBMS) software and that include suitable RAID disk arrays and/or any other suitable data storage mechanism. The usage and hardware statistics may be transmitted to the MTS database 22 using CSV files and/or any other suitable data format from the network servers 18. Each network server 18 may transmit its periodic statistics to the MTS database 22, and/or one or more of the network servers 18 in a LAN 12 could collect the statistics for multiple network servers 18 in the LAN 12 and transmit the collection to the MTS database 22. The MTS database 22 may be implemented as an Oracle or SQL database, for example, or any other suitable database.

In various embodiments, in order to predict future computer resource needs of the enterprise, the resource prediction computer system 20 groups pertinent variables into clusters so that each pertinent variable is a member of one cluster and so that the dependency between the variables with the same cluster is high, but the very low relative to the variables in other clusters. The processor 24 may perform this function by executing the software of the variable grouping module 30. After the clusters are determined, the resource prediction computer system 20 uses k-NN searching in various embodiments in order to compute the predictions. The processor 24 may perform this function by executing the software of the k-NN searching module 32.

Figure 2:
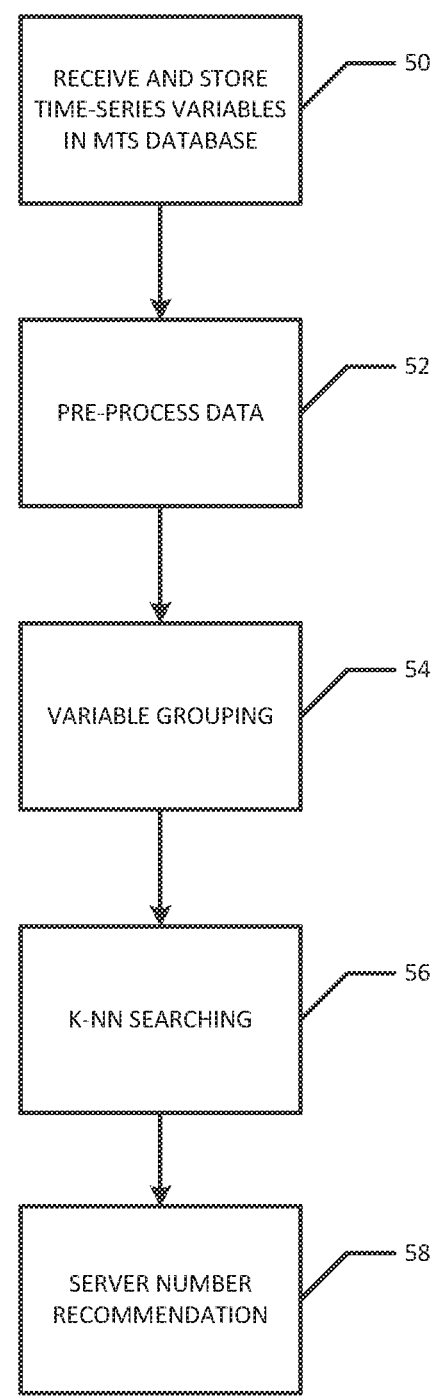
FIG. 2 is a flow chart of a process flow for determining a server number recommendation for the enterprise computer system of FIG. 1 according to various embodiments of the present invention.

FIG. 2 is a process flow of the prediction process that may be executed by the resource prediction computer system 20 in conjunction with the MTS database 22 according to various embodiments. At step 50 the MTS database 22 receives and stores the time series usage and hardware statistic variables for the enterprise's network servers 18. The data is collected for periodic time increments, such as every five minutes, 10 minutes, or any other suitable time increment. Next at step 52, the resource prediction computer system 20 can pre-process the MTS data stored in the database 22 to eliminate or reduce noise and/or to scale the data to standard normally distributed data using conventional data pre-processing techniques.

When dealing with high-dimensional time series, the overall k-NN estimation based on all dimensions may have great error due to interference between irrelevant metrics. However, since some of the measured computer hardware metrics are closely related to each other and share similar behaviors, the associated information would be lost if the prediction is extracted merely from univariate time series. To exploit the aggregated knowledge from all relevant variables, before performing the k-nn searching the high-dimensional MTS is decomposed into groups of smaller ones, where the dependency between variables within the same group is high, but very low with those in other groups. This operation is performed at step 54 in FIG. 2 by the processor 24 of the resource prediction computer system 20 generating the variable clusters by executing the software of the variable grouping module 30. Such decomposition also narrows the model space greatly, thus speeding up the subsequent k-NN search. In various implementations, the variable grouping includes two stages: (i) correlation matrix construction and (ii) variable clustering.

Given a MTS with d variables and of length T, a correlation coefficient can be used to measure the relevance between two variables. In one embodiment, Spearman's rank correlation coefficient is used, which is a nonparametric measure of the monotonicity of the relationship between two variables. The Spearman correlation does not assume that both datasets are normally distributed. For a sample of size n, the raw variables Xi, Yi are converted to ranks $x_i$, $y_i$, and Spearman's rank correlation coefficient, $\rho$, is computed from these as follows:

$$\rho = \frac{\sum_i (x_i - \bar{x})(y_i - \bar{y})}{\sqrt{\sum_i (x_i - \bar{x})^2 \sum_i (y_i - \bar{y})^2}}$$

where $x_i$, $y_i$ refer to the raw variables, and $\bar{x}$, $\bar{y}$ refer to the average of the variables.

Note that one variable could affect another after a certain time lag, thus for each pair of variables i, j, the algorithm can explore from 0 to a predefined "MaxLag" time period and select the maximum coefficient to be $\rho_{ij}$ that is:

$\rho_{ij} = \max\{\rho(x_i, x_j) \text{ with lag } t\}$ for $i \neq j$,
and $i, j \leq n$, and $t \leq \text{MaxLag}$ The pairwise correlation coefficients among all variables are computed to form a n×n correlation matrix. Table 1 below is an example correlation matrix constructed in experiments with a particular network server host. Note that it is a symmetric matrix with higher values (e.g., greater than 0.300 and up to 1) indicating stronger correlations.

TABLE 1

| Variable | 0 | 1 | 2 | 3 | 4 | 5 | 6 |
|---|---|---|---|---|---|---|---|
| 0 | 1 | 0.981 | 0.307 | 0.053 | 0.053 | 0.008 | 0.008 |
| 1 | 0.981 | 1 | 0.333 | 0.048 | 0.048 | 0.005 | 0.005 |
| 2 | 0.307 | 0.333 | 1 | 0.012 | 0.012 | 0.004 | 0.004 |
| 3 | 0.053 | 0.048 | 0.012 | 1 | 1 | 0.018 | 0.018 |
| 4 | 0.053 | 0.048 | 0.012 | 1 | 1 | 0.018 | 0.018 |
| 5 | 0.008 | 0.005 | 0.004 | 0.018 | 0.018 | 1 | 1 |
| 6 | 0.008 | 0.005 | 0.004 | 0.018 | 0.018 | 1 | 1 |

Based on the correlation matrix constructed above, the partitioning method can be applied to decompose the n variables into clusters. In various embodiments, the Affinity Propagation (AP) clustering algorithm is used for this step. AP is a clustering algorithm based on the concept of "message passing" between data points. Unlike other known partition methods, such as k-means and k-medoids, AP does not require the number of clusters to be determined or estimated before running the algorithm. Therefore, it is more adaptive to the present embodiment because the grouping result may vary as the input hardware metrics change. More details about AP may be found at Brendan J. Frey et al., "Clustering by passing messages between data points," Science 31:972-976 (2007), which is incorporated herein by reference in its entirety.

The AP algorithm creates clusters by sending messages between pairs of samples until convergence. The messages sent between points have two categories. One is the responsibility that sample k should be the exemplar for sample i, denoted by r(i, k). The other is the availability that sample i should choose sample k to be its exemplar, denoted by a(i, k):

$$r(i,k) \leftarrow s(i,k) - \max_{k' \ s.t. \ k' \neq k} \{a(i,k') + s(i,k')\}$$

$$a(i,k) \leftarrow s(i,k) - \min\{0, r(k,k) + \sum_{i' \ s.t. \ i' \notin \{i,k\}} \max\{0, r(i',k)\}\}$$

where s(i,k) is the similarity between samples i and k. The algorithm performs the calculation of the two matrixes until convergence. Table 2 shows the clustering results based on the matrix in Table 1.

TABLE 2

| Clustering Result of AP Algorithm | |
|---|---|
| Clusters | Variable Index |
| 1 | [0, 1, 2] |
| 2 | [3, 4] |
| 3 | [5, 6] |

As can be seen in this example, each variable 0 to 6 belongs to one of the groups/clusters.

After the variable clusters are determined, at step 56 the k-NN algorithm is used to make the desired predictions. For explanation purposes, the k-NN searching algorithm is first illustrated for a univariate situation, and only for a one-step ahead value based on a fixed number of immediately preceding history data measured at a constant-width time interval. Consider a finite and equidistant time series $x_t$, for t=(1, 2, ..., T), for which predictions $\hat{x}_{T+h}$ are made from point T for a forecasting horizon h=(1, 2, ..., H). First, in order to represent features of the recent states of time series, a set of feature vectors is created. Segments of equal length m are considered as vectors $\vec{x}_t^m$ of a sequence of m consecutive observations, $\vec{x}_t^m = [x_t, x_{t-1}, \ldots, x_{t-(m-1)}]^T$ where m is a predetermined integer referred to as sampling length. Note that vectors are created overlapping with all t=(m, m+1, m+2, ..., T-m), so called m-histories.

Next, to identify similar patterns of behavior in the past, the distance between all m-histories and the last observed vector $\vec{x}_t^m = [x_T, x_{T-1}, \ldots, x_{T-(m-1)}]^T$ are calculated respectively, using a given distance metric, such as, in various embodiments, the Euclidian Distance metric:

$$D(\vec{x}_i^m, \vec{x}_j^m) = \sqrt{\sum_{k=1}^{m-1}(x_{i-k}, x_{j-k})^2} = \|\vec{x}_i^m, \vec{x}_j^m\|$$

Figure 3:
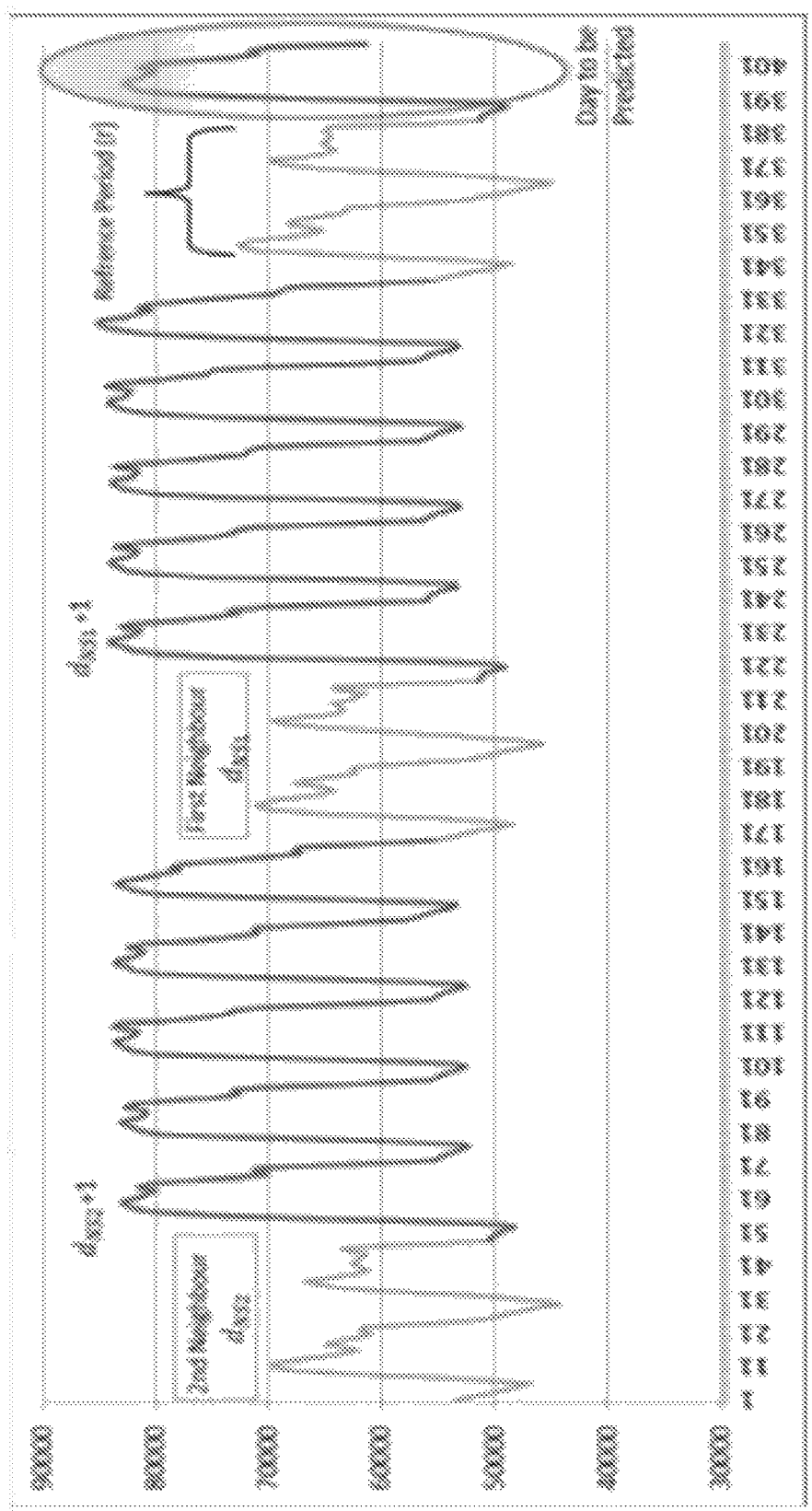
FIG. 3 is a graph illustrating an example of the prediction method for the univariate k-NN approach according to various embodiments of the present invention.

Finally, the pairwise distances for all m-histories are ranked, and the subsequent observations of k vectors with the lowest distance to target feature vector are selected respectively. Each of the k nearest neighbors can be locally weighted, and then aggregated to form a prediction $\hat{x}_{T+h}$:

$$\hat{x}_{T+h} = \sum_{j=1}^{k} w_j neigh_{j,h}$$

where $neigh_{j,h}$ is the subsequent value with horizon h of neighbor j, and $w_j$ denotes the weight. FIG. 3 is a graph illustrating the prediction method for the univariate k-NN approach. It shows the two closest neighbors to (days 171 to 221 and 1 to 51) to a reference period (days 341 to 381).

In the multivariate case, the reference (e.g., latest) feature vector and m-histories in the univariate case are extended to multiple dimensions. Let $X^d$ denote a multivariate time series (MTS) of d dimensions. To predict the future of MTS at time T, the target feature matrix is $\vec{x}_T^m = [\vec{x}_{T,1}^m, \vec{x}_{T,2}^m, \ldots, \vec{x}_{T,d}^m]$, where $\vec{x}_{T,i}^m$ denotes the last observed vector at time T in dimension i. Similarly, the distance metric can be defined as the sum of the distance metric (e.g., Euclidean distances in all d dimensions:

$$D(\vec{x}_i^m, \vec{x}_j^m) = \sum_{k=1}^{d} \|\vec{x}_i^m, \vec{x}_j^m\|$$

By searching over the m-histories, the global k nearest neighbors close to the current (or other reference) state of MTS can be found, each of which is composed by d vectors of m consecutive observations. The subsequent values with horizon h of k nearest neighbors can be denotes as the referential k×d matrix:

$$neigh_h = \begin{bmatrix} x_{11,h} & x_{12,h} & \cdots & x_{1d,h} \\ x_{21,h} & x_{22,h} & \cdots & x_{2d,h} \\ \vdots & \vdots & \ddots & \vdots \\ x_{k1,h} & x_{k2,h} & \cdots & x_{kd,h} \end{bmatrix}$$

The predictive value for each dimension is generated by aggregating the referential items in corresponding dimension:

$$\hat{x}_{T+h,d} = \sum_{j=1}^{k} w_{jd} neigh_{jd,h}$$

where neighbors in each dimension are respectively weighted to form the result. In one embodiment, the weights are obtained by the gradient descent algorithm and are gradually adjusted to match the new data. The predictions can forecast the cumulative user resource requests for the time horizon and the server resources required to handle those requests. Thus, the predictions yield the predicted server workload for the time horizon step. This process can be repeated for additional time horizon steps to obtain an extended workload forecast.

At step 58 of FIG. 2, the resource prediction computer system 20 can recommend a number of servers at a future time horizon step. Such server number predictions can be used for numerous beneficial purposes. One such purpose is that the enterprise could provision its servers 18 based on the forecasted number of servers. A number of computed metrics may be used in such capability planning, including the following metrics:

CPU/Memory/Disk overload and underload ratios. Calculation of these metrics can be performed by averaging the overload and underload values (above or below the respective overload and underload thresholds) for the CPU, memory and disk. The thresholds can be 90% for overload and 10% for underload, for example.

CPU/Memory/Disk overload and underload time ratios. These metrics can be calculated based on the ratio of how long the CPU/Memory/Disk is overloaded (above the overload threshold) or underloaded (below the underload threshold), compared to an entire duration.

Overall overload and underload time ratio. In this calculation, if any of CPU/memory/disk metrics for a server is overloaded or underloaded, then the server is considered overloaded or underloaded, as the case may be.

These metrics can be predicted for future time steps by the resource prediction computer system 20 based on the k-NN predicted CPU/memory/disk loads described above (see step 56).

These forecasted overload/underload metrics can be used as input parameters for various recommendation methodologies for recommending hardware resources for the enterprise computer system, such as a recommended number of servers 18 (see FIG. 1). Three such recommendation methodologies are the so-called "Capacity-based server number recommendation" (C-SNR), "Usage-based server number recommendation" (U-SNR), and "Adaptive server number recommendation" (A-SNR). In the C-SNR, the number of requests that can be processed by a server is predetermined. Therefore when the total number of requests is predicted, the number of servers can be easily derived. In U-SNR, the user's most likely time to perform a server request is known based on the user's usage passage and classification. The user's average load values for a request are also known based on the user's classification, so the expected load the user's request will bring to the system can be predicted. By applying an allocation algorithm which tries to make full use of servers capacities, the number of servers can be decided. In A-SNR, the ratio (actually threshold) is used to determine which server to send a new user session to and whether a new server should be added. When a new request is made, the first attempt is for a currently operational server to handle the request. The request is assigned to a current server based on its potential load level, which is estimated from the classification results. If the new request cannot be allocated to a currently active sever because of the overload status, a new server is added to handle the request. Similarly, when a request is completed, the remaining workload can be rebalanced among the servers 18.

No matter which of this metrics or others is used, the resource prediction computer system 20 can forecast an appropriate number of servers 18 for the enterprise for particular time periods based on the forecasted user workload. The resource prediction computer system 20 could communicate these server number recommendations to a network server 40 that acts as a broker (see FIG. 1) for the network servers 18. Based on the determinations communicated from the resource prediction computer system 20, this broker server(s) 40 can determine how many servers 18 in a LAN 12 should be turned on (full active, operational mode) and or put into low power modes (e.g., idle or sleep mode) at various times and instruct the servers 18 accordingly. That way, some of the network severs 18 could be put in low power modes during time periods when they are not forecasted to be needed based on the forecasted usage and/or load patterns. For example, with reference to FIG. 1, the resource prediction computer system 20 could determine a forecasted number of network servers 18 that are needed for a particular time period. The forecast can be for the network servers 18 in one LAN 12 or across multiple LANs 12. The resource prediction computer system 20 can transmit this number to the broker server 40, which can instruct the various servers 18 in its LAN 12 and/or in other LANs 12 to be in an operational, high power mode (able to handle user resource demands) or to be in a low-power mode (unable to handle user resource demands) at the appropriate times. The network servers 18 can assume the instructed power modes accordingly. That way, at times of low forecasted network resource needs, a number of the network servers 18 can be put into low power modes to conserve energy and associated costs. Conversely, at times of high forecasted network resource needs, a sufficient number of network servers 18 will be ready to handle the expected user request load.

In various embodiments, the processor 24 (when executing the k-NN searching module software 32) selects the k and m parameters for the k-NN searching prior to the k-NN searching. The module 32 may use the high-climbing algorithm to tune the k and m parameters to minimize the forecasting error for the different datasets. The high-climbing algorithm iterative algorithm that starts with an arbitrary solution to a problem (in this case, the k and m parameters), then attempts to find a better solution by incrementally changing a single element of the solution. If the change produces a better solution, an incremental change is made to the new solution, repeating until no further improvements can be found. In other embodiments, the k and m parameters are re-established.

The relationship between predictions with the K-nearest neighbors can change with time. Therefore, the weights are preferably adjusted with time. Suppose $Train_t = [x_{t-1}, x_{t-2}, \ldots, x_{t-n}]$ represents the training set of size n at time t. $x_t$ is the true value at time t and $y_t$ is the predicted value for time t. Based on the weight obtained previously, $y_t$ can be predicted based on $Train_t$. After the real value of $x_t$ is known, the weight can be updated based on $Train_{t+1} = [x_t, x_{t-1}, \ldots, x_{t-n+1}]$, with this new weight being used to predict $y_{t+1}$.

Another common issue is that the computing resources needed in an enterprise changes dynamically. If an enterprise maintains the number of servers corresponding to its highest workload, it will be a big waste since there is no need for such a big number of servers during low workload time. In order to accomplish the target of maintaining enough servers to satisfy user demands as well as saving energy as much as possible, it is necessary to predict the workload. Accordingly, various embodiments of the present invention provide a workload generation method based on a prediction and stripe sampling approach. By predicting the future number of requests in unit time, analyzing the features of requests and classifying the requests accordingly, and determining the slice sampling strategy, future detail workload data can be generated. The future workload data can provide the basis for the dynamic adjustment of server resources.

In one general aspect, the prediction and stripe sampling approach can be divided into steps. First, the time series prediction model is applied to predict the number of requests in unit time. Based on k-Nearest Neighbor (KNN) algorithm, K sub-sequences which are similar to current sub-sequences in the request number time series data are searched. Then a linear regression model can be applied to compose the predictions given by K nearest neighbor sequences to the final prediction results.

Second, the features of requests are analyzed. Each request consumes different resources (such CPU load, memory). Besides, the length of each request needs to be predicted. The analysis can be divided into three types according to various embodiments:

a. Correlation Analysis. Correlation analysis can be performed on different attributes of requests. If two attributes are correlated, they depend on each other while two attributes that are not correlated will not affect each other.

b. Request Classification. By classifying the requests on highly related attributes, requests can be divided into different types, such as short-duration demand with low internal storage cost, long-duration demand with low internal storage cost, long-duration with high internal storage cost et al.

c. Periodic Analysis. The negative effects that are brought by periodic elements should be removed. Requests show remarkable differences between working hours and non-working hours. If it is desired to sample a request, a request in the similar periodical time should be selected for the sampling.

Third, with the combination of sliced-based sampling and period-based sampling, requests are selected from the historical data according to the percentages of each category and compose these request data into the final predictions.

This process has the advantage that the workloads are measured based on multiple metrics, which overcomes limitations of single metric. Another potential advantage is that it makes a more accurate prediction by modeling workloads brought by each request, taking into account the number of future requests and the impact of each request on the various metrics. As such, the method overcomes the limitations of the overall workload forecast approach.

Figure 5:
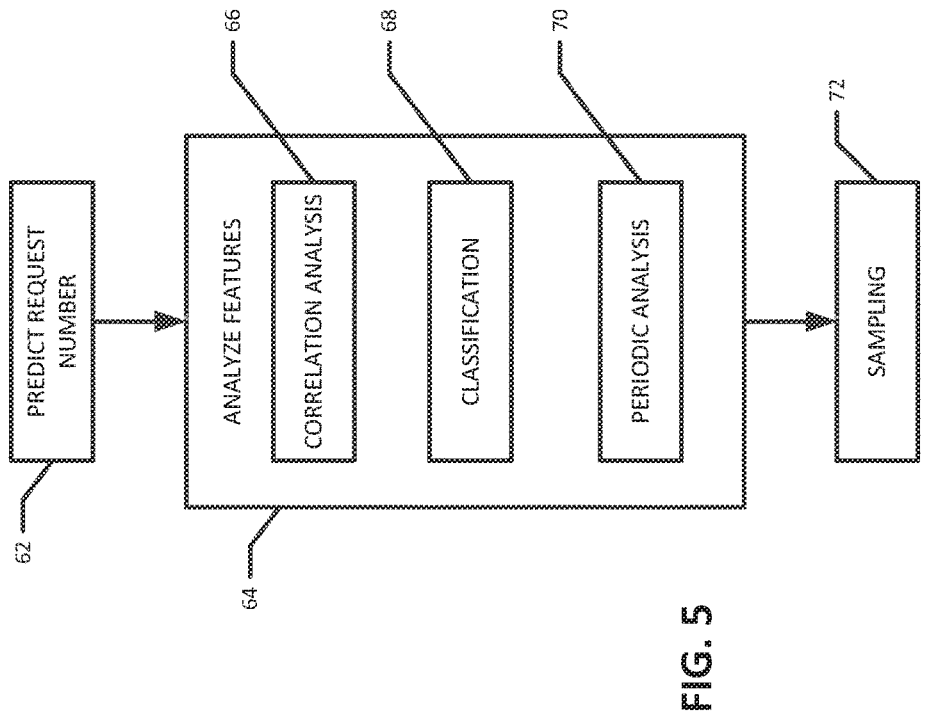
FIG. 5 is a flow chart of a process flow executed by the on computer system of FIG. 3 according to various embodiments of the present invention.
Figure 4:
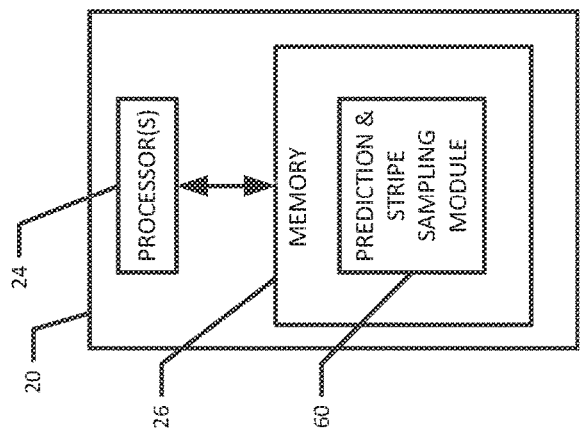
FIG. 4 is a block diagram of the prediction computer system of FIG. 1 according to various embodiments of the present invention.

FIG. 4 is diagram of the resource prediction computer system 20 and FIG. 5 is a diagram of a process flow executed by resource prediction computer system 20 in order to implement this prediction and stripe-sampling strategy to generate future workload traces according to various embodiments of the present invention. As shown in FIG. 3, according to such an embodiment the resource prediction computer system 20 may comprise a prediction and stripe sampling module 60 for generating the future workload trace. The prediction and stripe sampling module 60 may be implemented as software code stored in the memory(ies) 26 and executed by the processor(s) 24 of the resource prediction computer system 20. The example process flow in FIG. 5 can be implemented by the resource prediction computer system 20 when the code of the prediction and stripe sampling module 60 is executed. In addition, the database 22 can store data about historical requests by the users of the network servers.

At step 62, the request number per unit time is predicted. The problem of predicting how many requests are submitted by users every unit time can be modeled as a time series prediction problem. As such, the K nearest neighbor classification algorithm can be used to find out sub-sequences similar to the current sub-sequence from the historical data stored in the database 22. Then the predictions obtained based on these similar sub-sequences can be combined together to produce the final prediction result. Assuming that the time interval is unit time T, the number of requests that occur within every unit time can be represented as $N=[n_1, n_2, \ldots, \ldots, n_p]$, where $n_i$ is the number of requests occurred in i-th unit time, and p can be expressed as:

$$p = \frac{t_{start} - t_{now}}{T}$$

In order to find when the request number is similar to those of the current time, a sub-sequence which consists of the most recent m observations can be drawn:

$$N_{now}=[n_{p-m+1}, n_{p-m+2}, \ldots, n_p]$$

The other observations can be denoted as:

$$N_{history}=[n_1, n_2, \ldots, n_{p-m}]$$

Multiple sub-sequences $N_{i,i+m-1}=[n_i, \ldots, n_{i+m-1}]$ can be found from the historical data which is most similar to $N_{now}$. An evaluation criterion to measure the similarity between the historical and the current sub-sequences can be used. Let Dis(X,Y) be the distance function to measure similarity between two time series. A distance function Euclidean distance can be used where:

$$Dis(X, Y) = \|X - Y\|_2 = \sqrt[2]{\sum_{i=1}^{m}(x_i - y_i)^2}$$

The distance between each historical sub-sequence and the current sub-sequence can be calculated. The historical sequence can be split into the sub sequence set $\{N_{1,1+m-1}, N_{2,2+m-1}, \ldots, N_{p-2*m+1,p-m}\}$. Then the distance can be calculated in order to find i in range $0 < i \leq p-2*m+1$, which makes the value of $Dis(N_{i,i+m-1}, N_{now})$ is the smallest. Then the most similar sub-sequence $N_{i,i+m-1}$ to the current one can be determined.

For every historical sub-sequence in the set, the distance $d_i=Dis(N_{i,i+m-1}, N_{now})$ can be calculated so that the distance set $D=\{d_1, d_2, \ldots, d_{p-2*m+1}\}$ can be obtained. After all of the elements in the D are sorted, the nearest distance[$d_a, d_b, \ldots, d_k$] can be determined, and the index of the distance [a,b, . . . , . . . , k] is the index of the most similar sub-sequences.

The sub-sequences immediately following these K nearest neighbor sequences are preferably combined to produce the final prediction. Two factors are preferably considered. First, the similarity should be considered in the model; generally, more similar ones should have larger weights. Second, the appearance time of the sub-sequences; generally, more recent ones should have larger weights. In various embodiments, therefore, the k sub-sequences are sorted according to their similarities to the current sub-sequence and the happen time. Then the linear regression approach can be applied to learn the weights for kth predictions.

Next, at step 64, the request features or attributes are analyzed. The attributes can comprise request data such as the duration of the request, the disk IO, the CPU and/or memory utilization, etc., as described above. This step 64 can involve three sub-steps according to various embodiments: correction analysis at step 66; request classification at step 68; and periodicity analysis at step 70. In the correction analysis step 66, each request generally brings different workloads to various computer resources. Therefore, multiple features should be used to characterize the workload. One complication is whether these workload features have correlations or not. For example, is should be known whether the claim that when CPU is less consumed, the disk I/O consumption is also decreased is true or not for an application.

Pearson correlation coefficients can be used in this step according to various embodiments. Assuming that a request workload has two (2) certain features, which can be further represented by two time sequence $X=[x_1, x_2, \ldots, x_N]$ and $Y=[y_1, y_2, \ldots, y_N]$, where the value of i-th request can be expressed as $(x_i, y_j)$, the correlation between these two features can be expressed as:

$$\rho_{X,Y} = \frac{N\sum_{i=1}^{N} x_i y_i - \sum_{i=1}^{N} x_i \sum_{i=1}^{N} y_i}{\sqrt{N\sum_{i=1}^{N} x_i^2 - \left(\sum_{i=1}^{N} x_i\right)^2} \sqrt{N\sum_{i=1}^{N} y_i^2 - \left(\sum_{i=1}^{N} y_i\right)^2}}$$

The greater the absolute value of this correlation coefficient, the higher the correlation degree is. When the value is close to 0, it indicates that two features are almost independent.

As to the request classification step 68, by observing the distribution of the feature values against the feature number, it can be found that some features may have multiple peaks, which indicates that the feature values can be classified. Requests can be classified into different types so that requests can be sampled from past according to the class ratio. During the classification process, classification should be made on correlated features. In this step, bisecting K-means, which is based on the classical k-means clustering algorithm, can be used to avoid falling into a local optimal solution. This clustering algorithm can divided into three steps. The first step is finding the clustering center; the second step is calculating the distance between each point to the cluster center and put each point into the nearest cluster; and the third step is computing the average value of all cluster coordinates as a new cluster center. The bisecting K-mean clustering method can be further enhanced by first putting all points into one cluster, then dividing one cluster into two, and finally selecting the cluster which could reduce the maximum degree of the error is divided into two clusters. This process can be repeated until the number of clusters is equal to the number of K given by the user.

Cyclical factors are an important factor in prediction. Since the request to the server is made from people, it is obvious that working time and non-work time request numbers differ. Therefore, the influence of cyclical factors should be considered in the periodicity analysis step 70. In one embodiment, Fast Fourier Transform (FFT) can be used to calculate the cycle length of the request feature sequence. The average value of the characteristic $x_i$ in time interval t can be obtained. Then, a time series f(n), where n=0, 1, 2, ..., N−1 can be determined, with its sampling rate of $$f_s = \frac{1}{t}.$$

Discrete Fourier transform (DFT) of f(n) is assumed as F(k), to get $$F(k) = \sum_{n=0}^{N-1} x(k) W^{nk}$$

where $$W = e^{-j\frac{2\pi}{N}}$$

k=0, 1, 2, ..., N−1. After getting the DFT, each k corresponds to a discrete frequency value $f_k$, which can be expressed as $$f_k = k\Delta f = k f_s/N$$

If the sequence is periodic, the spectrum of the Fourier transform function will be hit at the reciprocal of the period, and the period of f(n) can be obtained by the impact value. For the request load represented by a single feature, it is only needed to sample the requests from the corresponding cycle time points. For the requests that have been classified into multiple categories, the proportion of each category in every time unit can be predicted, which can be done by adopting the K-NN approach introduced in step 62.

According to the results of the analysis, at step 72 the request data from the historical data can be extracted in order to simulate future requests. Suppose that the periodicity analysis shows that the length of the cycle is $T_{period}$. In classification, the requests are divided into K classes, and historical request collection $N_{history}$ is divided into a number of sub-sets.

$$N_{t,k} = \{n_{t,k,1}, n_{t,k,2}, \ldots, n_{t,k,m}\}$$

Suppose that p requests are predicted to occur in the future at a certain time interval $t_{predict}$, and that the predicted proportion of the k-st class is $w_k$. The number of requests of category k is, therefore, $p_k = w_k * p$. In the range of the size of the history subset $N_{t_{predict},k}$, $p_k$ random numbers can be generated to select requests. The requests of all categories can then be synthesized into a collection of simulated future requests. The occurrence time of each historical request is not fixed in each unit time interval. It's relative starting time can be expressed as:

$$t_{unit} = t_{actual} - kT, k=0,1,2,\ldots$$

During the simulation of the future request sequence, the actual request time can be expressed as $$t_{predict} = t_{unit} + t_{period}.$$

By the method above, the future workload trace can be generated. And based on the future workload traces, a server number recommendation can be made for the future time period so that the needs of the enterprise's users can be met based on the expected workloads (see step 58 of FIG. 2).

One advantage of the above-described solution is that the workloads are measured based on multiple metrics, which overcomes limitations of single metric. Another advantage is that it makes a more accurate prediction by modeling workloads brought by each request, taking into account the number of future requests and the impact of each request on the various metrics. As such, the solution overcomes limitations experienced with the overall workload forecast approach.

Anther potential beneficial use of the forecasted usage patterns is for an enterprise migrating to virtual desktops hosted by cloud computing vendors that offer desktop-as-a-service (DaaS). The enterprise can run projections to determine its forecasted DaaS resource sizing, such as number of CPUs, amount of RAM, and/or amount of storage. That way, the enterprise can avoid reserving too much cloud computing resources for its needs (and thereby overpaying for its needs) and reserving too little loud computing resources (and thereby not having the needed resources for its users).

Figure 6:
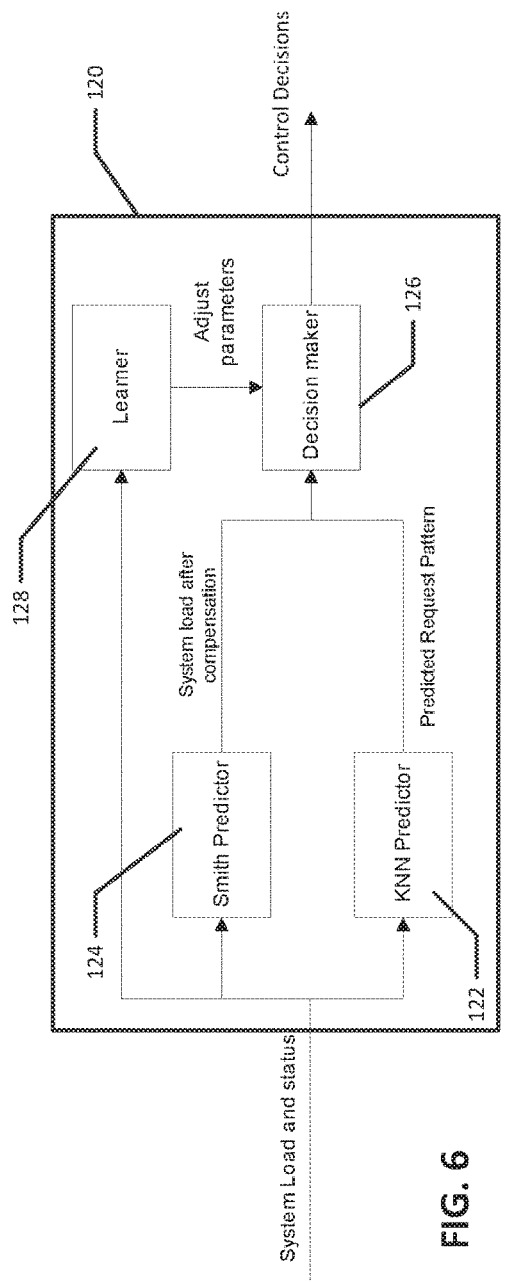
FIG. 6 illustrates an example of a controller of resource prediction computer system of FIG. 1) according to various embodiments of the present invention.

Another beneficial use is determining the number of network servers 18 the enterprise needs for a particular workload or resource. Based on the enterprise's forecasted usage patterns for the particular resource that show how many servers are needed (according to any of the recommendation methodologies described above), the enterprise can procure the appropriate number of servers. For example, when the system is under high load, the controller will add more servers, e.g. virtual servers to the system, for sharing the requests. When the system is under low load, the controller will return excessive resources back to reduce the cost. FIG. 6 illustrates a controller 120 (e.g., the resource prediction computer system 20 shown in FIG. 1) for making such determinations.

The requests of the system can be described as time-series data, i.e., the number of the requests is changing with time periodically. For example, the requests in the daytime will generally be more than the requests in the night. In various embodiments of the present invention, the controller 120 predicts the future requests and adjusts the system according to different policies. The general steps of the process are described below in conjunction with FIG. 6.

The k-NN predictor 122 uses the k-NN algorithm to predict the future requests. In various embodiments, the predictor 122 only predicts the request pattern during the next period instead of a specific number of periods. The request patterns can be divided into three types: increasing, decreasing and fluctuating. A request pattern can be classified as increasing if the request number increases over X1 periods (e.g., 3 periods) or increased over Y1% (e.g., 40%) during Z1 periods (e.g., Z1=2). The next patterns after an increasing pattern will also be classified as increasing patterns until they meet successive non-increasing periods. A request pattern is classified as decreasing if the request number keeps decreasing for over X2 periods (e.g., X2=X1=3) or decreased over Y2% (e.g., Y2=Y1=40%) during Z2 periods (e.g., Z2=Z1=2). Other patterns are classified as fluctuating, except that in various embodiments periods following an increasing or decreasing pattern can also be classified to increasing or decreasing, as the case may be, until a decreasing period or increasing period occurs.

Figure 7:
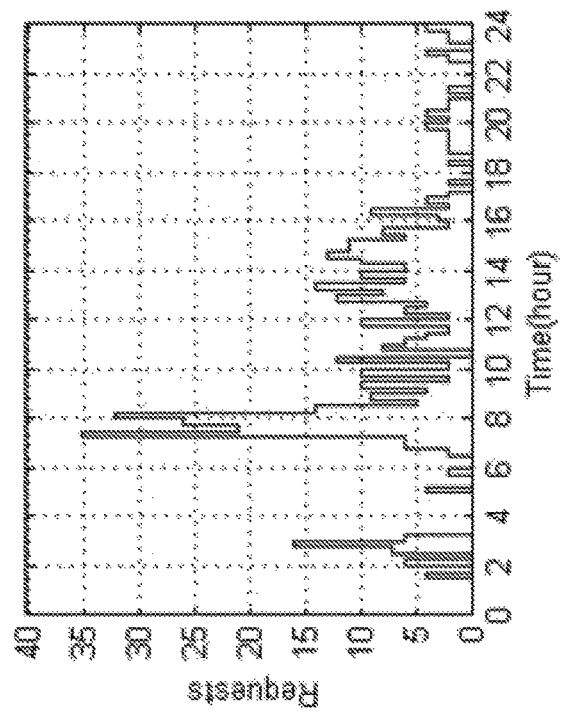
FIG. 7 shows an example of a typical load (e.g., number of request) for network servers of an enterprise computer system over a day.

FIG. 7 shows a typical service system's load in one day. In this example the sample period is every 15 minutes. In this example, from 7 am to 8 am, the request data is under an increasing pattern. The request number increases quickly with few decreasing periods in the time frame. From 8 am to 9 am, the request number is under a decreasing pattern, with the request number decreasing most of the periods during this hour. From 10 am to 2 pm (i.e., 14 on the time/hour axis), the request data is under a fluctuating pattern since the request numbers keep fluctuating during this 4 hour time span. The other periods can be classified similarly. After dividing request patterns into the three types, the k-NN predictor 122 predicts the request pattern for the next control cycle. The request number of every control cycle is recorded. The predictor 122 groups a number of successive points (e.g. 5 successive points) as a group and takes the most recent data group as the sample data to classify. Then the k-NN predictor 122 searches the history data for similar groups. In various embodiments, the k-NN predictor 122 searches similar periodical times in the history as the requests ordinarily exhibit periodicity. The variance between two groups is used to determine the similarity degree between them. The k-NN predictor 122 then chooses the K most similar groups (e.g., K=5). After finding these similar groups, the k-NN predictor 122 gets the patterns of the next periods of the groups and takes the highest frequent pattern as the prediction of the requests pattern for the next period.

The three patterns have different features. Consequently, the decision maker 126 can apply different control policies. For an increasing pattern, it is required to add servers in advance as acquiring the server resources from the virtual provider and waiting for the service to start up will require time. The formula below can be used to calculate the required number of additional servers $$u(t)=Ke(t)+AK(r'(t+T_c)-r'(t))$$

Here u(t) is the control output at time t, which is the number of servers to add; e(t) is the deviation of the system's load with the ideal load; K is the proportionality coefficient; r'(t) is the predicted request number at time t; $T_c$ is the control cycle; A is the prediction influence coefficient (it determines how much the prediction affects the control process). The first part on the right side of the equation (i.e., Ke(t) is a traditional proportionality control. The second part (i.e., $AK(r'(t+T_c)-r'(t))$) introduces the influence of the prediction to the control process, affecting the output by the prediction influence coefficient.

In a decreasing pattern, as reducing servers rarely has delay, there is little or no need to reduce servers in advance. The decision maker 126 can therefore close and return the servers when the system is under low load. The calculation can be according to the formula, u(t)=Ke(t). Compared to the formula above for increasing patterns, the decreasing pattern formula just includes the proportionality control part.

In fluctuating patterns, the decision maker 126 has to deal with the changing of the system's load carefully as the requests may frequently fluctuate. If the decision maker 126 lets the servers just fluctuate with the load, it may lead to unsteadiness of the system and cause a great waste as the servers may be paid for by the hour, in addition to the energy consumption costs incurred from the servers repeatedly booting up and shutting down. As such, for fluctuating patterns, the decision maker 126 can use the formula below:

$$u(t) = \begin{cases} Ke(t), & e(t) \geq 0 \\ K\max(e(t), e(t-T_c), e(t-2T_c)), & e(t) < 0, e(t-T_c) < 0, \\ & e(t-2T_c) < 0 \\ 0, & \text{otherwise} \end{cases}$$

When e(t)≥0, the decision maker 126 just adds servers by proportionality control. When e(t)<0, which means that the number of servers may need to be reduced, the decision maker 126 collects the load levels over the last three control periods (or some other number of control period), and if during all these periods the system was under low load, the controller chooses the control period (of the three control periods) with the greatest load to calculate the number of servers to close and return as described above for a decreasing pattern. The goal of the control policy can be to stabilize the server number while ensuring the system's stability.

As adding servers may have some delay, the controller 120 may include a Smith predictor 124 to compensate for the influence of the delay. The Smith predictor 124 can receive as input the number of servers which are available/purchased but that are not yet in use. Based on this input, the Smith predictor 124 estimates the capacities of these servers and compensates these pending capacities to the system's current load. The compensated system's load is then delivered to the decision maker 126 for use in the decision making process. The principle of Smith predictor 124 is that, in various embodiments, the compensation part is introduced into the feedback of the system, which will put the delayed feedback amount into the decision maker 126 in advance.

Figure 8:
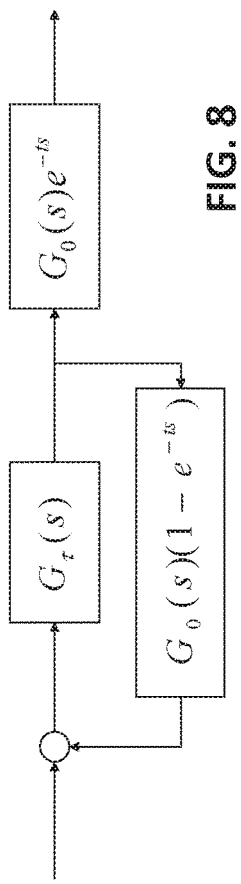
FIG. 8 is a diagram of a transfer function for the controller of FIG. 6 according to various embodiments of the present invention.

FIG. 8 is the transfer function for the controller 120 according to various embodiments of the present invention. In this diagram, $G_0(s)e^{-ts}$ represents the lag in the system, and the transfer function of the Smith predictor is $G_0(s)(1-e^{-ts})$. The Smith predictor 124 is connected to the k-NN predictor 122 $G_r(s)$, and the controller with pure time delay compensation is formed. After adding the Smith predictor, the closed-loop transfer function of the system becomes:

$$\phi_T(s) = \frac{Y(s)}{R(s)} = \frac{G_C(s)G_0(s)}{1 + G_C(s)G_0(s)} e^{-ts}$$

The characteristic equation is:

$$1 + G_c(s)G_0(s) = 0$$

It can be seen that the lag term in the characteristic equation is eliminated after compensation of the Smith predictor, which reduces the effect of the delay on the system The learner 128 collects system load and status information and uses that information to adjust online the proportionality coefficient K in the decision maker 126. The proportionality coefficient K determines how the controller 120 reacts to the system's load. The larger the K value, the more adjustments are made, but thereby making the system more susceptible to fluctuations. The learner 128 can adjust K online according to the formula, $$K(t) = K(t - T_c) + L\left(\frac{sT}{r} - K(t - T_c)\right)$$

where T is the sampling time period length, s is the average number of servers in this period, r is the number of complete requests in this period, sT/r represents the efficiency of unit server in unit time, L is the amended coefficient, deciding the adjusting rate. When the value of L is large, the K responds more quickly but may also lead to fluctuations.

The controller 120 can implemented the process described above with appropriate software instructions stored in the member 26 and executed by the processor(s) 24 of the computer system 20 (see FIG. 1). For example, the memory 26 may include software module for the k-NN prediction, Smith prediction, learning, and decision making, that are executed by the processor(s) 24 to implement the process described above. The results can be provided to the broker computer system 40, which can implement the ramping up or down of the network servers, as the case may be. By the incorporation of these four parts (122, 124, 126, 128) and applying different control policies for the various request patterns, embodiments of the present invention can do the proper control to the scalable cloud system for most time periods, ensuring the system's performance and reducing unnecessary cost.

Yet another beneficial use is simulation of virtual user workloads. Historical and forward looking temporal data based on actual client workloads could be generated for simulated load testing of the virtual system.

In various embodiments, therefore, the present invention is directed to computer systems and associated computer-implemented methods of forecasting network resource needs for an enterprise computer system. According to various embodiments a computer database system receives and stores multivariate time-series (MTS) performance data for the plurality of network servers. The MTS performance data comprise data for a plurality of d performance variables for the plurality of network servers for a series of prior sampling times. A programmed computer system (e.g., the resource prediction computer system 20) groups variables in the MTS performance data into two or more variable groups, such that each of the performance variables in the MTS performance data belongs to a variable group. The programmed computer system then computes predictions of future workloads of the network servers of the enterprise computer system by computing predictions for the variables at one or more future time horizon steps. The programmed computer system computes the predictions by performing steps that comprise (i) finding the k nearest neighbors to a reference state of the MTS performance data using a k-nearest neighbor searching algorithm applied to the two or more variable groups; and (ii) computing a weighted average of the k nearest neighbors. Then the programmed computer system can determine a recommended number of network servers needed by the enterprise to be in operational modes to handle resource requests by the users of the enterprise computer system at each of the one or more future time horizon steps based on the computed predications.

In various implementations, the performance variables for the plurality of network servers comprise variable indicative of at least CPU load, primary computer memory utilization, and secondary computer storage input/output (IO) operations per unit time period. Also, the step of grouping the variable can comprise the steps of: computing, by the programmed computer system, a correlation matrix indicating the correlation between each pair of performance variables; and determining, by the programmed computer system, the variable groups based on the correlation matrix using a clustering algorithm. The correlation matrix may comprise a Spearman correlation matrix and the clustering algorithm may comprise an Affinity Propagation clustering algorithm.

Also, the step of finding the k nearest neighbors to the reference state of the MTS performance data may comprise: (i) computing distances between a vector representing the reference state of the MTS and each of a plurality of vectors that represent the MTS data at prior sampling times, respectively; and (ii) determining the k vectors for prior sampling times that have the smallest distance to the vector representing the reference state of the MTS. The computed distances may be Euclidean distances.

In addition, the he programmed computer system may transmit data indicative of the recommended number of network servers needed by the enterprise to be in operational modes to handle the resource requests by the users of the enterprise computer system for at least one of the future time horizon steps. As such, the one or more broker computer systems may instruct the network servers such that the recommended number of network servers is in operational modes to handle the resource requests by the users for the at least one future time horizon step.

In another general aspect, the present invention is directed to computer system and associated computer-implemented methods for predicting a future workload of the network servers over a future time period. A programmed computer system (e.g., the resource prediction computer system 20) predicts a number of requests p for the future time period based on a sorting of k nearest sub-sequences of time periods where the number of requests to the network servers by the users of the enterprise computer system per unit time T is most similar to a current sub-sequence of recent time periods. Then the programmed computer system classifies historical requests (based on data stored in the database 22) into two or more request type classes based on attributes of the requests. Then the programmed computer system predicts a proportion of requests in the future time period for each of the two or more request type classes based on a proportion of historical requests in each of the two or more request type classes. Then the programmed computer system determines a periodicity for the one or more request attributes for the request type classes. Then the programmed computer system samples p historical requests such that the p samples have the predicted proportion of each of the two or more request type classes and such that the p samples are from a same request cycle point as the future time period based on the periodicity of the request type classes. Finally, the programmed computer system synthesizes the p sampled historical request to obtain a workload trace for the network servers for the future time period.

According to various implementations, the one or more broker system can adjust the status of the network servers at the future time period based on the predicted future workload. Also, the programmed computer system can classify the historical requests into the two or more request type classes based on attributes of the requests comprises; perform a correlation analysis of the attributes of the historical requests; and classify the historical requests into the two or more classes based on the correlation analysis. The programmed computer system can compute Pearson correlation coefficients between pairs of attributes of the requests in performing the correlation analysis and use a clustering algorithm to divide the requests into the two or more requests based on the request attributes of the requests. Also, a Fast Fourier Transform can be used in the periodicity analysis to calculate a cycle length of the one or more request attributes of the two or more classes According to another general aspect, the present invention is directed to computer systems and associated computer-implemented methods of forecasting network resource needs for the enterprise computer system. A programmed computer system (e.g., the resource prediction computer system 20) determines a predicted user-resource request pattern for a future time horizon step based on user request data of the enterprise computer system users. Then the programmed computer system computes a recommended number of servers needed by the enterprise for the future time horizon step based on a classification of the predicted user-resource request pattern for the future time horizon step. In so doing, the programmed computer system uses a first control policy to compute the recommended number of servers when the predicted user-resource request pattern for the future time horizon step is classified as increasing, and uses a second control policy to compute the recommended number of servers when the predicted user-resource request pattern for the future time horizon step is classified as decreasing.

In various implementations, the first control policy uses a first formula with a proportionality constant K to compute the recommended number of servers and the second control policy uses a second formula with the proportionality constant K to compute the recommended number of servers. In that case, the programmed computer system can also adjust the proportionality constant K online for the first and second control policies based on an efficiency of a unit network server in a unit time period. Also, the programmed computer system may also use a third control policy to compute the recommended number of servers when the predicted user-resource request pattern for the future time horizon step is not classified as increasing or decreasing. The third control policy can also use a (third) formula with the proportionality constant K to compute the recommended number of servers.

In various implementations, a predicted user-resource request pattern for the future time horizon step is classified as increasing when one or more conditions are met, where the one or more conditions comprise a first condition that the predicted request number increased over a first threshold number (N1) of consecutive time horizon steps and a second condition that the predicted request number increased by more than a first threshold percentage over a second threshold number (N2) of consecutive time horizon steps. Also, the one or more conditions for an increasing classification can comprise a third condition that (i) an immediately prior time horizon step was classified as increasing and (ii) the future time horizon step is not classified as decreasing. Similarly, a predicted user-resource request pattern for the future time horizon step can be classified as decreasing when one or more conditions are met, where the one or more conditions comprise a first condition that the predicted request number decreased over a third threshold number (N3) of consecutive time horizon steps and a second condition that the predicted request number decreased by more than a second threshold percentage over a fourth threshold number (N4) of consecutive time horizon steps. There can also be a third condition for a decreasing classification that (i) an immediately prior time horizon step was classified as decreasing and (ii) the future time horizon step is not classified as increasing. The programmed computer system can also compensate for the capacities of available network servers that are not presently in use when computing the recommended number of servers needed by the enterprise for an increasing future time horizon step.

It should be noted the FIG. 1, for example, only illustrates components of an enterprise computer system 10 sufficient to understand aspects of the present invention. It should be recognized that the enterprise computer system 10 could include a number of internetworked LANs, WANs, MANs, etc., with wired (e.g., Ethernet over twisted pair cabling) or wireless (e.g., Wi-Fi) communication links. The network servers 18 could handle numerous and different types of resources as required by the enterprise, and the client computers 16 may be any suitable type of network-enabled end-user computer device, such as laptops, personal computers, tablet computers, smartphones, etc. The resource prediction computer system 20 could be implemented by one or more networked computer devices. Where the resource prediction computer system 20 comprises multiple computer devices, they could be internetworked by one or more LANs, WANs, MANs, etc. In addition, the enterprise computer system 10 may include additional broker computers 40 for provisioning the servers 18.

The software modules described herein can be implemented in one or more computer programs that are written in any suitable computer language, such as Python, such that when the processor(s) 24 executes the software programs of the modules, the processor(s) 24 is caused to perform the functions of the modules described herein. Suitable processors 24 for the execution of a program of instructions include, by way of example, both general and special purpose microprocessors. Further, any computer component described herein can include a single processor or multiple processors. The processor 24 receives instructions and data from a read-only memory or a random access memory or both.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method of forecasting network resource needs for an enterprise computer system, wherein the enterprise computer system comprises a plurality of network servers that host computer resources for users of the enterprise computer system, the method comprising:
   receiving, by a computer database system, a multivariate time-series (MTS) of performance data for the plurality of network servers, wherein the performance data comprise data for a plurality of d performance variables for the plurality of network servers for a series of m prior sampling times, such that there are m-histories of the MTS;
   grouping, by a programmed computer system that is in communication with the computer database system, each of the performance variables of the MTS into two or more performance variable groups, such that each of the performance variables of the MTS belongs to a variable group, wherein the step of grouping the performance variables comprises:
      computing, by the programmed computer system, a correlation matrix indicating a strength of correlation between each pair of performance variables; and
      determining, by the programmed computer system, the variable groups based on the strength of correlation using a clustering algorithm;
   computing, by a programmed computer system, predictions of future workloads of the network servers of the enterprise computer system by computing predictions for the variables at one or more future time horizon steps, wherein computing the predictions comprises:
      finding the k nearest neighbors to a reference state of the MTS using a k-nearest neighbor searching algorithm applied to the two or more variable groups, wherein finding the k nearest neighbors comprises:
         computing distances between a target feature matrix representing a reference state of the MTS and target feature matrices for each of the m-histories, respectively; and
         determining the k target feature matrices for prior sampling times that have the smallest distance to the target feature matrix representing the reference state of the MTS, wherein each of the k target feature matrices comprises d vectors of m sampling time observations; and
      computing a weighted average of subsequent values of the MTS at a horizon time step h of the k nearest neighbors such that the weighted average yields a cumulative user resource requests for the enterprise computer system at the horizon time step h; and
   determining, by a programmed computer system, a recommended number of network servers needed by the enterprise to be in operational modes to handle resource requests by the users of the enterprise computer system at each of the one or more future time horizon steps based on the computed cumulative user resource requests.

2. The method of claim 1, wherein the performance variables for the plurality of network servers comprise variable variables indicative of at least the following:
   CPU load;
   primary computer memory utilization; and
   secondary computer storage input/output (TO) operations per unit time period.

3. The method of claim 1, wherein the correlation matrix comprises a Spearman correlation matrix.

4. The method of claim 3, wherein the clustering algorithm comprises an Affinity Propagation clustering algorithm.

5. The method of claim 1, wherein computing distances comprises computing Euclidean distances.

6. The method of claim 1, further comprising:
   transmitting by the programmed computer system data indicative of the recommended number of network servers needed by the enterprise to be in operational modes to handle the resource requests by the users of the enterprise computer system for at least one of the future time horizon steps; and
   instructing, by one or more broker computer systems that are in communication with the programmed computer system, the network servers such that the recommended number of network servers is in operational modes to handle the resource requests by the users for the at least one future time horizon step.

7. A resource forecasting computer system for forecasting network resource needs for an enterprise computer system, wherein the enterprise computer system comprises a plurality of network servers that host computer resources for users of the enterprise computer system, the resource forecasting computer system comprising:
   a computer database system that is in communication with the plurality of network servers for storing a multivariate time-series (MTS) of performance data for plurality of network servers, wherein the performance data comprise data for a plurality of d performance variables for the plurality of network servers for a series of m prior sampling times, such that there are m-histories of the MTS;
   a programmed computer system that is in communication with the computer database system, wherein the programmed computer system comprises a processor and memory, wherein the memory stores software, that when executed by the processor, cause the processor to predict future workloads of the network servers of the enterprise computer system by performing steps that comprise:
      grouping each of the performance variables of the MTS into two or more performance variable groups, such that each of the performance variables of the MTS belongs to a variable group, such that the processor of the programmed computer system groups the performance variable by performing steps that comprise:
         computing a correlation matrix indicating a strength of correlation between each pair of performance variables; and
         determining the variable groups based on the strength of correlation using a clustering algorithm;
      computing predictions for the variables at one or more future time horizon steps that indicate workloads for the network servers, wherein the predictions are computed by steps that comprise:
         finding the k nearest neighbors to a reference state of the MTS using a k-nearest neighbor searching algorithm applied to the two or more performance variable groups, wherein finding the k nearest neighbors comprises:
            computing distances between a target feature matrix representing a reference state of the MTS and target feature matrices for each of the m-histories, respectively; and
            determining the k target feature matrices for prior sampling times that have the smallest distance to the target feature matrix representing the reference state of the MTS, wherein each of the k target feature matrices comprises d vectors of m sampling time observations; and
         computing a weighted average of subsequent values of the MTS at a horizon time step h of the k nearest neighbors such that the weighted average yields a cumulative user resource requests for the enterprise computer system at the horizon time step h; and
      determining a number of network servers needed by the enterprise to be in operational modes to handle resource requests by the users of the enterprise computer system at each of the one or more future time horizon steps based on the computed cumulative user resource requests; and
   at least one broker computer system in communication with the programmed computer system and the plurality of network servers, wherein the at least one broker computer system is for:
      receiving from the programmed computer system data indicative of a recommended number of network servers needed by the enterprise to be in operational modes to handle resource requests by the users of the enterprise computer system for at least one of the future time horizon steps; and
      instructing the network servers such that the recommended number of network servers is in operational modes to handle the resource requests by the users for the at least one future time horizon step.

8. The resource forecasting computer system of claim 7, wherein the performance variables for the plurality of network servers comprise variable variables indicative of at least the following:
   CPU load;
   primary computer memory utilization; and
   second computer storage input/output (TO) operations per unit time period.

9. The resource forecasting computer system of claim 7, wherein the correlation matrix comprises a Spearman correlation matrix.

10. The resource forecasting computer system of claim 7, wherein the clustering algorithm comprises an Affinity Propagation clustering algorithm.

* * * * *